(12) United States Patent
Kwon et al.

(10) Patent No.: US 8,792,452 B2
(45) Date of Patent: Jul. 29, 2014

(54) COMMUNICATION METHOD OF A VEHICULAR MOBILE TERMINAL, A MACRO BASE STATION, A NEIGHBOR MICRO BASE STATION, AND A SERVING MICRO BASE STATION IN A MULTI-CELL GROUP

(75) Inventors: Tae Soo Kwon, Hwaseong Si (KR); Woo Geun Ahn, Daejeon-si (KR); Dong Ho Cho, Daejeon-si (KR); Min Suk Kang, Daejeon-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 274 days.

(21) Appl. No.: 12/985,942

(22) Filed: Jan. 6, 2011

(65) Prior Publication Data

US 2011/0261785 A1 Oct. 27, 2011

(30) Foreign Application Priority Data

Apr. 27, 2010 (KR) ........................ 10-2010-0038819

(51) Int. Cl.
| | | |
|---|---|---|
| *H04W 4/00* | (2009.01) | |
| *H04W 64/00* | (2009.01) | |
| *H04W 36/18* | (2009.01) | |
| *H04W 76/02* | (2009.01) | |
| *H04W 36/08* | (2009.01) | |

(52) U.S. Cl.
CPC .............. *H04W 64/00* (2013.01); *H04W 36/18* (2013.01); *H04W 76/02* (2013.01); *H04W 36/08* (2013.01)
USPC ............................ 370/331; 370/332; 455/436

(58) Field of Classification Search
None
See application file for complete search history.

(56) References Cited

U.S. PATENT DOCUMENTS

| | | | |
|---|---|---|---|
| 5,457,810 A | | 10/1995 | Ivanov et al. |
| 5,513,380 A | * | 4/1996 | Ivanov et al. ................. 455/441 |
| 5,999,522 A | | 12/1999 | Rohani |
| 6,438,377 B1 | | 8/2002 | Savolainen |
| 6,714,528 B1 | * | 3/2004 | Moon et al. ................... 370/342 |
| 2001/0004595 A1 | * | 6/2001 | Dent ............................. 455/435 |

(Continued)

FOREIGN PATENT DOCUMENTS

| | | |
|---|---|---|
| EP | 0 526 436 A1 | 2/1993 |
| JP | 2002-271258 | 9/2002 |

(Continued)

OTHER PUBLICATIONS

Extended European Search Report issued Jul. 26, 2011, in counterpart European Application No. 11160195.1, 9pp.

(Continued)

*Primary Examiner* — Ian N Moore
*Assistant Examiner* — Brian T Le
(74) *Attorney, Agent, or Firm* — NSIP Law

(57) ABSTRACT

A communication method of a serving micro base station is provided. The method includes a handover of a vehicular mobile terminal based on uplink broadcast information including a unique access code allocated to the vehicular mobile terminal within a multi-cell group. The multi-cell group includes a macro base station and a plurality of micro base stations within a cell coverage of the macro base station. The handover is performed based on a determined preparation level of the handover that is based on the uplink broadcast information.

24 Claims, 10 Drawing Sheets

(56) References Cited

U.S. PATENT DOCUMENTS

| | | | |
|---|---|---|---|
| 2003/0235165 A1* | 12/2003 | Wang | 370/331 |
| 2008/0056193 A1* | 3/2008 | Bourlas et al. | 370/331 |
| 2008/0161000 A1* | 7/2008 | Li et al. | 455/436 |
| 2009/0028112 A1* | 1/2009 | Attar et al. | 370/332 |

FOREIGN PATENT DOCUMENTS

| | | |
|---|---|---|
| JP | 2004-312241 | 11/2004 |
| KR | 10-0171022 | 10/1998 |
| KR | 10-2009-0006312 | 1/2009 |

OTHER PUBLICATIONS

Chou et al., "Ranging Process for IEEE 802.16j," Document No. IEEE S802.16j-06_172, Submitted on Nov. 7, 2006, pp. 1-6.

Cesar et al, "GPS Assisted Initial Ranging in IEEE 802.16m," *IEEE 802.16 Broadband Wireless Access Working Group Project*, Submitted on Jan. 8, 2009, pp. 1-3.

Loa et at, "RS Periodic Ranging with Dedicated Ranging Code," *IEEE 802.16 Broadband Wireless Access Working Group Project*, Submitted on Apr. 25, 2007, pp. 1-2.

* cited by examiner

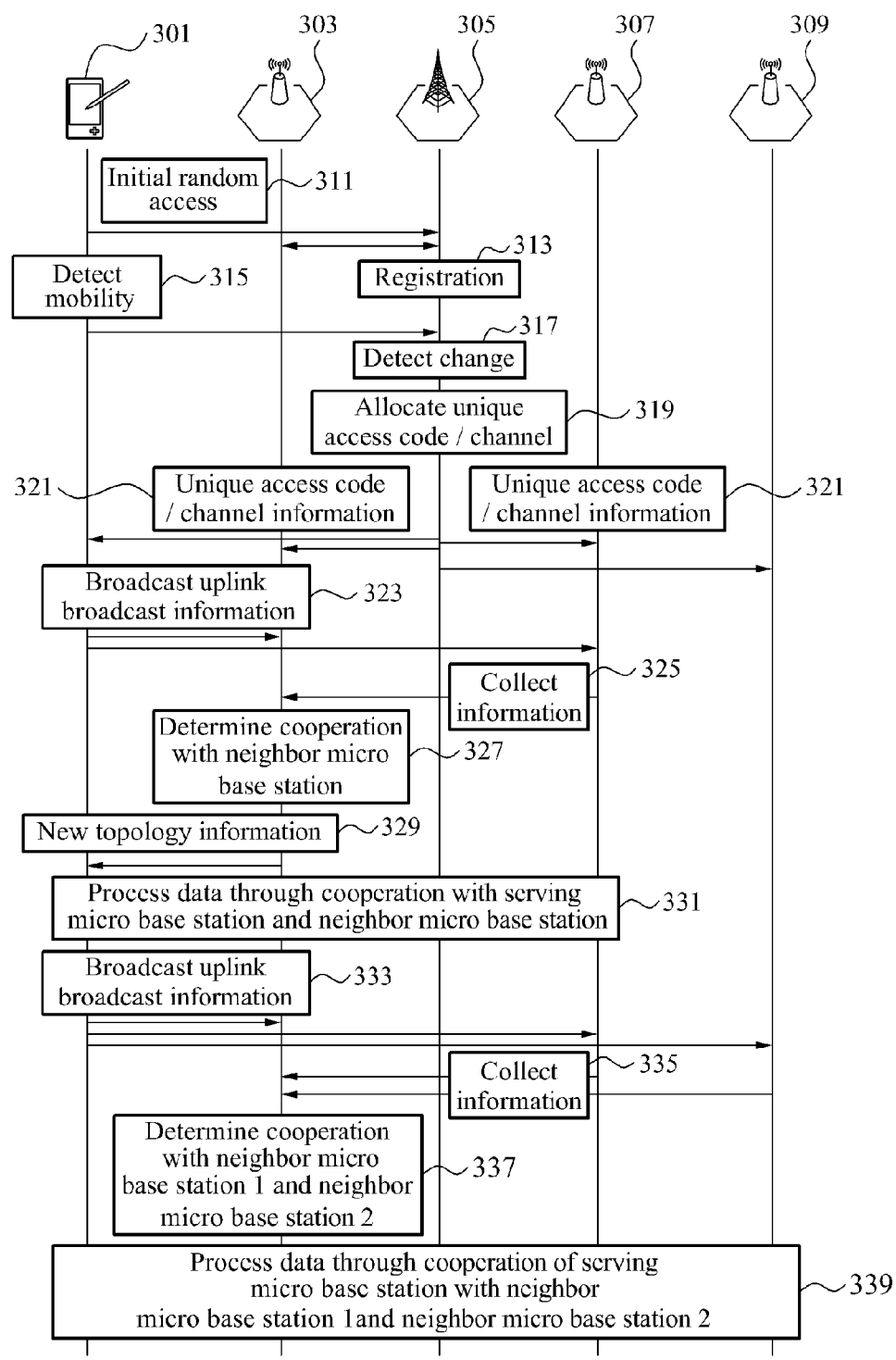

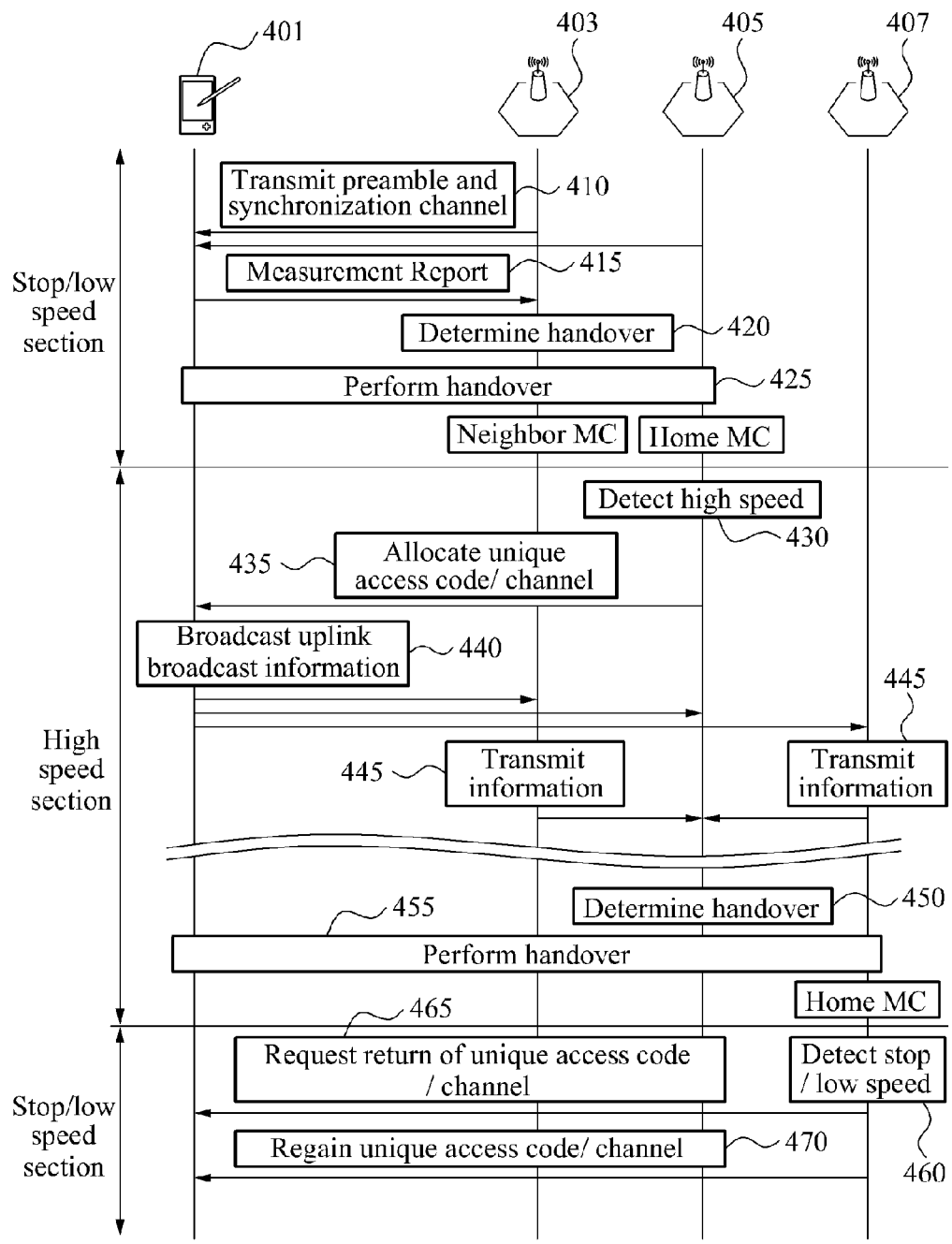

COMMUNICATION METHOD OF A VEHICULAR MOBILE TERMINAL, A MACRO BASE STATION, A NEIGHBOR MICRO BASE STATION, AND A SERVING MICRO BASE STATION IN A MULTI-CELL GROUP

CROSS-REFERENCE TO RELATED APPLICATION(S)

This application claims the benefit under 35 U.S.C. §119(a) of Korean Patent Application No. 10-2010-0038819, filed on Apr. 27, 2010, in the Korean Intellectual Property Office, the entire disclosure of which is incorporated herein by reference for all purposes.

BACKGROUND

1. Field

The following description relates to a communication method of a base station and a vehicular mobile terminal, and more particularly, to a communication method of a serving micro base station, a neighbor micro base station, a macro base station, and a vehicular mobile terminal.

2. Description of Related Art

In a mobile communication system, a terminal may be mobile. Because of this mobility, when the terminal moves near the edge of or beyond the service coverage of a base station serving the terminal, a handover of the terminal to a new base station is needed in order to maintain service. In a wireless communication system, determining whether to perform a handover is based on various qualities, for example, the quality of a downlink channel between a terminal to be handed over and a target base station.

A base station serving a terminal to be handed over may request the terminal to measure qualities of a neighbor base station and a wireless link, and report about the measurement results to the base station. The serving base station may request the new target base station for a handover based on reported values of the qualities of a wireless channel, and the target base station may provide a response to the request.

When receiving an acceptance message of the handover from the target base station, the serving base station may transmit a message to instruct performance of the handover to the terminal, and the terminal may send a response message to the base station in service indicating that the handover is to be performed.

SUMMARY

In one general aspect, there is provided a communication method of a serving micro base station that is serving a vehicular mobile terminal, the method comprising identifying a unique access code allocated to the vehicular mobile terminal in a multi-cell group, the multi-cell group comprising a macro base station and a plurality of micro base stations that are within a cell coverage of the macro base station, receiving uplink broadcast information including the unique access code from the vehicular mobile terminal, and performing a handover of the vehicular mobile terminal based on the uplink broadcast information.

The unique access code may be allocated to the vehicular mobile terminal based on a mobility of the vehicular mobile terminal.

The method may further comprise collecting information about a receiving state of the uplink broadcast information of a neighbor micro base station from the neighbor micro base station in the multi-cell group.

The method may further comprise determining a preparation level of a handover associated with a level of an operation used for the serving micro base station and a neighbor micro base station to perform the handover.

The determining of the preparation level of the handover may comprise determining a preparation level of the handover based on the uplink broadcast information received by the serving micro base station and uplink broadcast information received by the neighbor micro base station.

The determining of the preparation level of the handover may comprise determining a preparation level of the handover based on at least one of a mobility of the vehicular mobile terminal, an estimated cell residence time of the vehicular mobile terminal, a backhaul environment between the serving micro base station and the neighbor micro base station, an amount of data used by the vehicular mobile terminal, a load of the serving micro base station, and a load of the neighbor micro base station.

The method may further comprise reporting about the determined preparation level of the handover to the neighbor micro base station.

The determining of the preparation level of the handover may comprise determining a preparation level of the handover to be at one of a plurality of levels including at least one of a preregistration, an uplink synchronization setup, an acceptance of a handover and performance of the handover, a joint interference control for the vehicular mobile terminal, a joint processing on the vehicular mobile terminal, and a cell merger.

The method may further comprise estimating a cell residence time of the vehicular mobile terminal based on the uplink broadcast information received from the serving micro base station.

The vehicular mobile terminal may comprise at least one of a femto base station, a moving relay, and a mobile terminal.

In another aspect, there is provided a communication method of a neighbor micro base station, the method comprising identifying a unique access code allocated to a vehicular mobile terminal in a multi-cell group, the multi-cell group comprising a macro base station and a plurality of micro base stations within a cell coverage of the macro base station, overhearing uplink broadcast information including the unique access code from the vehicular mobile terminal, and reporting information about a receiving state of the uplink broadcast information to a serving micro base station that is serving the vehicular mobile terminal.

The reporting information about the receiving state of the uplink broadcast information may comprise reporting the information about the receiving state of the uplink broadcast information in order to determine a preparation level of a handover associated with a level of an operation used for the serving micro base station and a neighbor micro base station to perform the handover.

The method may further comprise identifying the preparation level of the handover based on a report of the serving micro base station.

The method may further comprise performing the handover of the vehicular mobile terminal based on the preparation level of the handover.

The identifying of the unique access code may comprise receiving information about a channel allocated for the unique access code from the macro base station.

The method may further comprise performing coordinated communication with the serving micro base station based on the determination of the serving micro base station, when the preparation level of the handover is determined to be a level including at least one of joint interference control for the vehicular mobile terminal and joint processing on the vehicular mobile terminal.

The method may further comprise estimating an uplink timing offset or estimating a quality of service (QoS) of the vehicular mobile terminal, based on the uplink broadcast information.

In another aspect, there is provided a communication method of a vehicular mobile terminal, the method comprising identifying a unique access code allocated to the vehicular mobile terminal in a multi-cell group, the multi-cell group comprising a macro base station and a plurality of micro base stations within a cell coverage of the macro base station, and broadcasting uplink broadcast information including the unique access code to the plurality of micro base stations.

The method may further comprise receiving information about a channel allocated for the unique access code from the macro base station, wherein the broadcasting of the uplink broadcast information comprises broadcasting the uplink broadcast information using the channel allocated for the unique access code.

In another aspect, there is provided a communication method of a macro base station, the method comprising identifying a mobility of a vehicular mobile terminal in a multi-cell group, the multi-cell comprising the macro base station and a plurality of micro base stations within a cell coverage of the macro base station, allocating a unique access code and a channel for the unique access code to the vehicular mobile terminal based on the mobility of the vehicular mobile terminal, and reporting about the unique access code and the channel for the unique access code to the plurality of micro base stations.

The method may further comprise regaining the unique access code and the channel for the unique access code based on the mobility of the vehicular mobile terminal.

The method may further comprise forwarding data about the vehicular mobile terminal from a serving micro base station to a neighbor micro base station based on a renewed data forwarding path, when a preparation level of a handover associated with a level of an operation used for the serving micro base station and the neighbor micro base station to perform the handover uses data forwarding.

The method may further comprise forwarding data about the vehicular mobile terminal to a neighbor micro base station when a preparation level of a handover associated with a level of an operation used for a serving micro base station and the neighbor micro base station to perform the handover uses cooperation between the serving micro base station and the neighbor micro base station.

In another aspect, there is provided a computer-readable storage medium having stored therein program instructions to cause a processor to implement a communication method of a serving micro base station that is serving a vehicular mobile terminal, the method comprising identifying a unique access code allocated to the vehicular mobile terminal in a multi-cell group, the multi-cell group comprising a macro base station and a plurality of micro base stations that are within a cell coverage of the macro base station, receiving uplink broadcast information including the unique access code from the vehicular mobile terminal, and performing a handover of the vehicular mobile terminal based on the uplink broadcast information.

Other features and aspects may be apparent from the following description, the drawings, and the claims.

BRIEF DESCRIPTION OF THE DRAWINGS

FIGS. 3A and 3B are diagrams illustrating examples of a process of performing a handover based on uplink broadcast information in a multi-cell group.

FIG. 4 is a diagram illustrating an example of a switch from a general handover scheme based on a measurement report of a downlink signal to a handover scheme based on uplink broadcast information.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

In the following description, a vehicular mobile terminal may include a mobile terminal which is installed in a vehicle and a mobile terminal which is transportable by a user. The term "mobile" may refer to an object in motion or to an object at rest that is capable of being set into motion.

Figure 1:
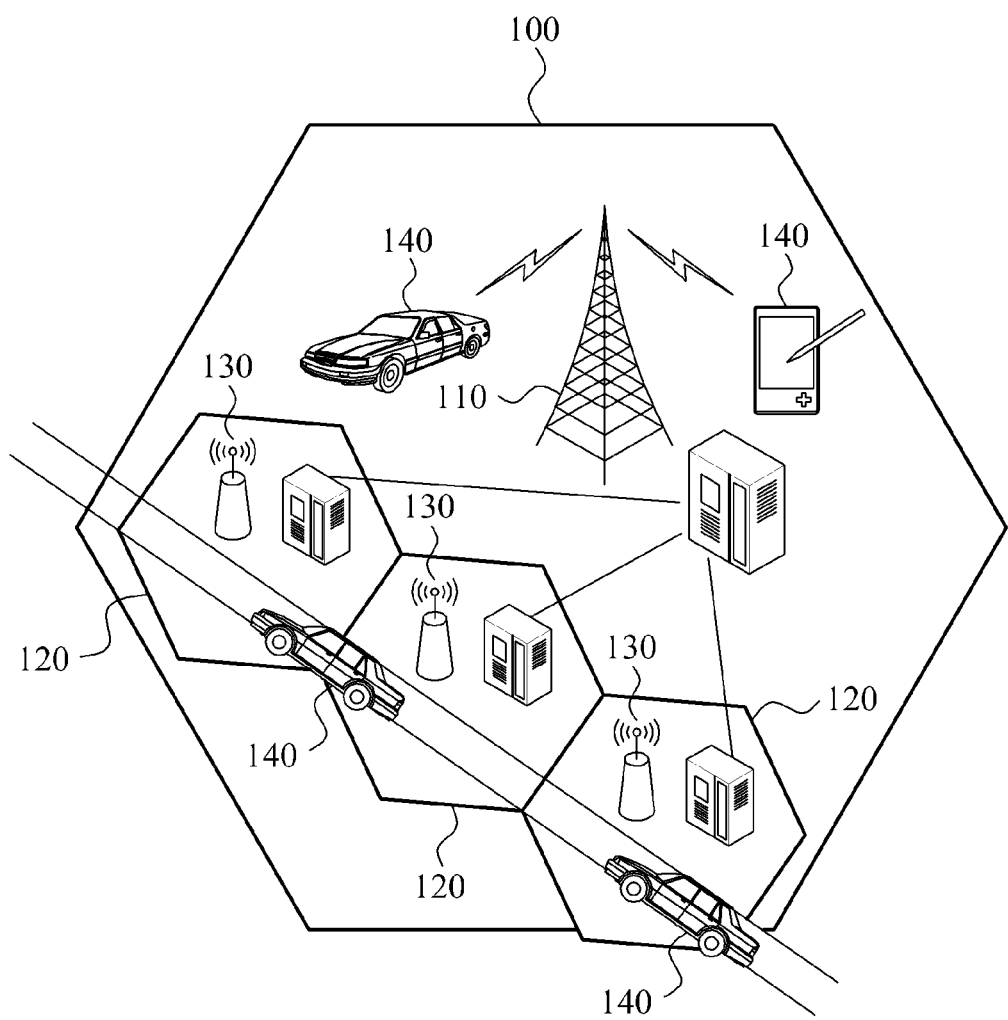
FIG. 1 is a diagram illustrating an example of a multi-cell group.

FIG. 1 illustrates an example of a multi-cell group.

Referring to FIG. 1, the multi-cell group includes a macro cell 100, a macro base station 110, a plurality of micro cells 120 within a cell coverage of the macro base station 110, a plurality of micro base stations 130 within the cell coverage of the macro base station 110, and a vehicular mobile terminal 140.

For example, the plurality of micro cells 120 may be fully or partially included in the coverage area of the macro cell 100, and the micro cells 120 may each include a respective micro base station 130.

The plurality of micro base stations 130 may include a serving micro base station that is currently serving the vehicular mobile terminal 140 and the neighbor micro base stations that may operate as a serving micro base station when a handover is performed.

For example, the macro base station 110 may allocate a unique access code and a channel for the unique access code to the vehicular mobile terminal 140 that is travelling within the macro cell 100 based on a mobility of the vehicular mobile terminal 140.

The unique access code and the channel for the unique access code may be allocated to the vehicular mobile terminal 140 based on the mobility of the vehicular mobile terminal 140, for example, the unique access code and the channel for the unique access code may be allocated to the vehicular mobile terminal 140 based on a predetermined speed and the like.

For example, the mobility of the vehicular mobile terminal 140 may include a traveling speed, a traveling direction, an estimated cell residence time, a traveling path, and the like, of the vehicular mobile terminal 140.

In this example, the estimated cell residence time may be changed based on a radius of the cell coverage. The mobility may also include an intensity of a signal received from the vehicular mobile terminal 140 to the serving micro base station and the neighbor micro base stations.

As an example, the unique access code allocated to the vehicular mobile terminal 140 may be available for a channel measurement of the vehicular mobile terminal 140, uplink synchronization, a joint cell formation, a handover determination, and the like. The unique access code and the channel for the unique access code allocated to the vehicular mobile terminal 140 may be maintained within the coverage of the same macro base station 110. For example, the unique access code and the channel for the unique access code allocated to the vehicular mobile terminal 140 may be renewed or maintained when a handover is performed between the macro cell 100 and another macro cell.

The vehicular mobile terminal 140 has the unique access code within the multi-cell such as the micro cells 120 or the macro cell 100 and vehicular mobile terminal 140 broadcasts uplink broadcast information including the unique access code to the micro base stations 130 in the macro cell 100.

The micro base stations 130 may receive the uplink broadcast information including the unique access code from the vehicular mobile terminal 140. For example, the serving micro base station may collect uplink broadcast information or information about the uplink broadcast information, for example, uplink reception power, received from a neighbor micro base station. The serving micro base station may use the collected information to perform a handover.

As an example, the vehicular mobile terminal 140 may include at least one of a femto base station, a moving relay, a mobile terminal, and the like.

Figure 2:
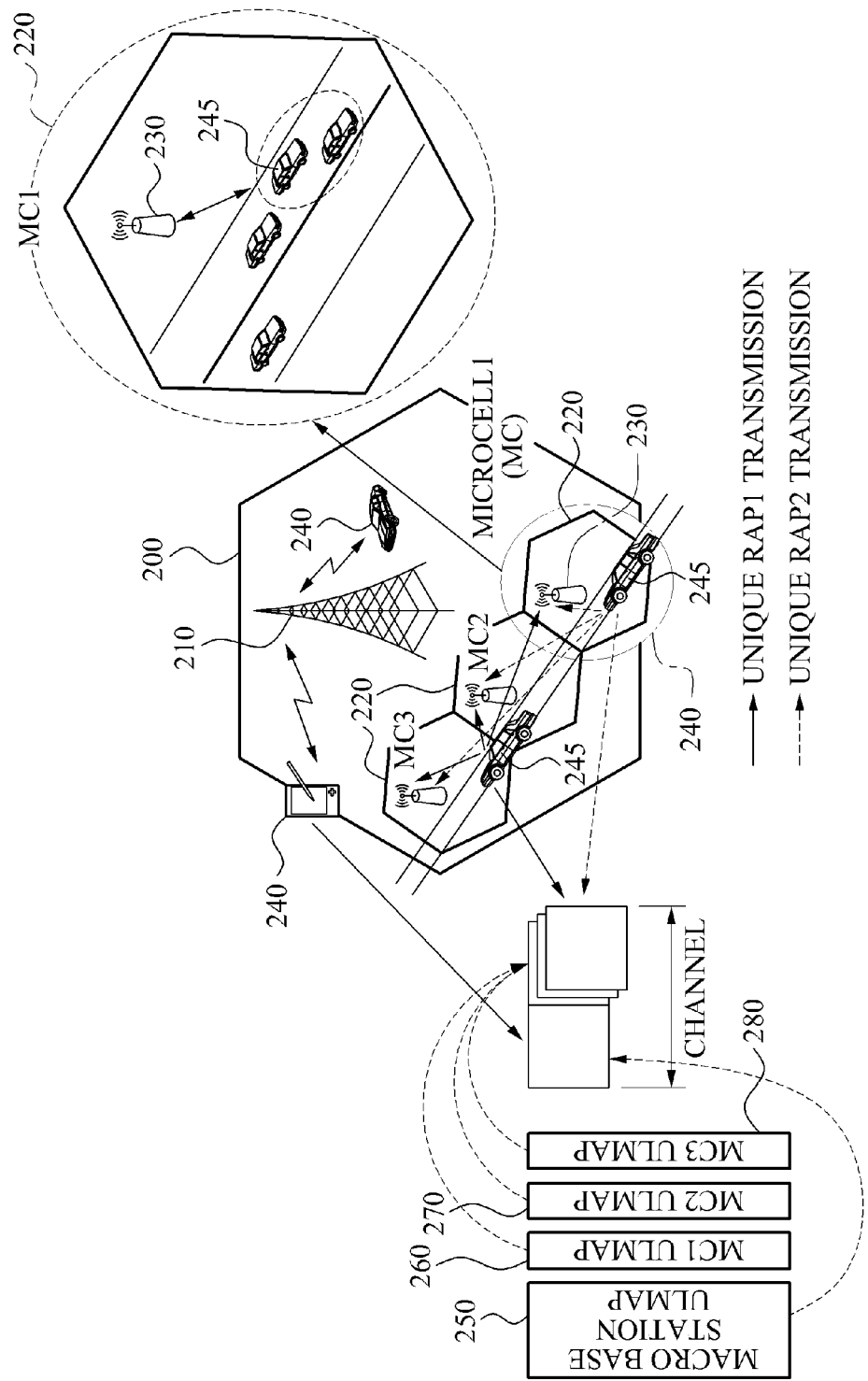
FIG. 2 is a diagram illustrating an example of a vehicular mobile terminal communicating with a macro base station and a vehicular mobile terminal communicating with a micro base station using different channels in the multi-cell group.

FIG. 2 illustrates an example of a vehicular mobile terminal communicating with a macro base station and a vehicular mobile terminal communicating with a micro base station using different channels in a multi-cell group.

FIG. 2 illustrates an example in which a vehicular mobile terminal 240 that communicates with a macro base station 210 and a vehicular mobile terminal 245 that communicates with a micro base station 230 coexist using a same-frequency channel. In this example, different channels may be allocated to a unique access code of the vehicular mobile terminal 240 in the macro cell 200 and a unique access code of the vehicular mobile terminal 245 in the micro cell 220, respectively.

For example, different channels may be allocated to prevent the unique access codes transmitted by the vehicular mobile terminals 245 in the micro cell 220 from going undetected, for example, due to a power of the unique access code transmitted by the vehicular mobile terminal 240 with a high power communicating with the macro base station 210 positioned on a cell boundary. As an example, a power level of the unique access code transmitted by each of the vehicular mobile terminals 240 and 245 may be set by the macro base station 210 or the micro base station 230.

A transmission power of the unique access code transmitted by each of the vehicular mobile terminals 245 in the micro cell 220 may be determined based on a transmission power offset value of a representative vehicular mobile terminal traveling in the cell, shown in dotted line.

For example, the transmission power offset value of the representative vehicular mobile terminal traveling in the cell (a vehicular mobile terminal in a dotted line) may be obtained, and the micro base station 230 may broadcast the value such that an adjacent vehicular mobile terminal may use the value. For example, the above scheme may be based on an adjacent vehicular mobile terminal travelling on a road having similar conditions of position and speed, and thus, communication paths and link qualities may be similar.

Figure 3B:
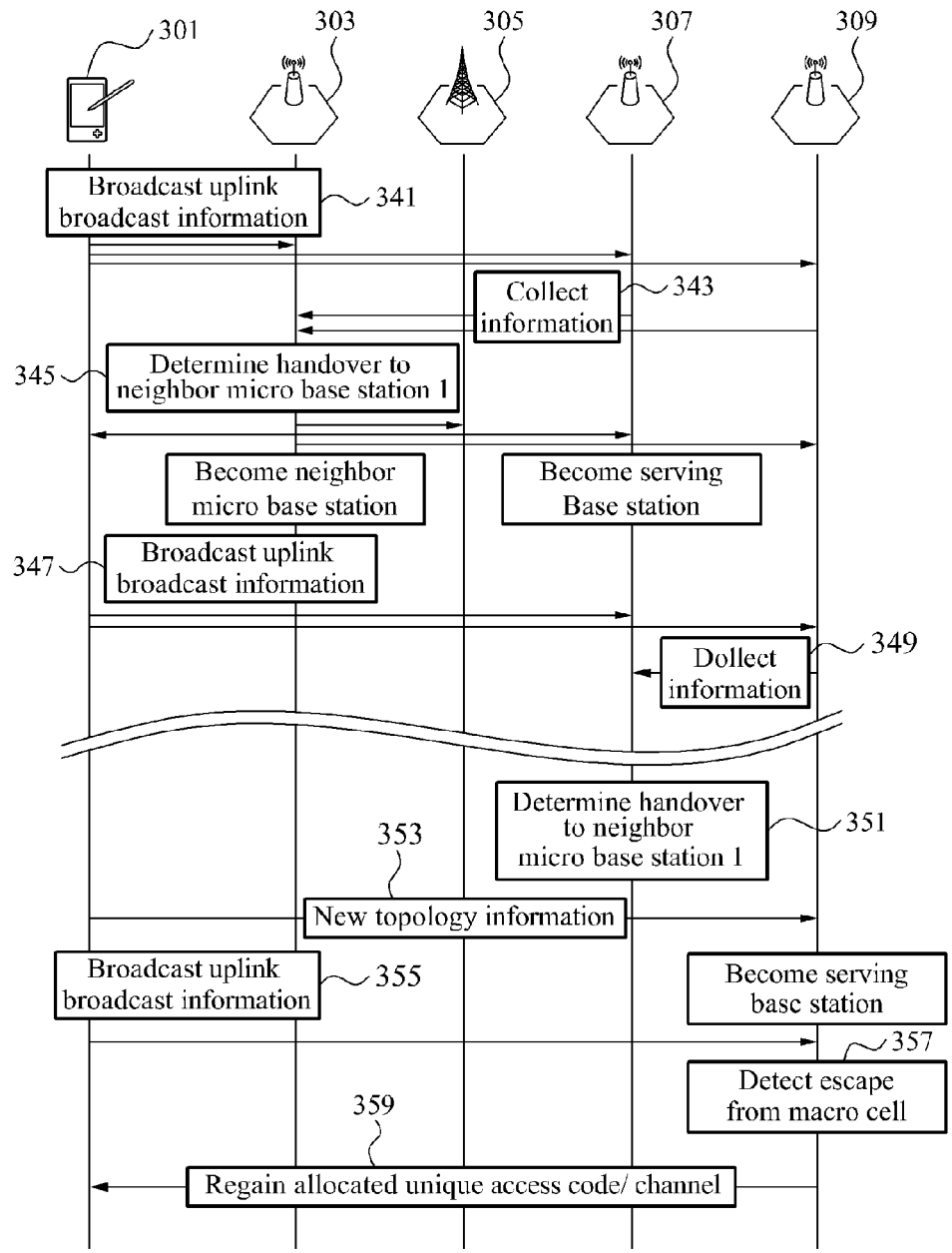

FIGS. 3A and 3B illustrate examples of a process of performing a handover based on uplink broadcast information in a multi-cell group.

Referring to FIGS. 3A and 3B, the multi-cell group includes a vehicular mobile terminal 301, a macro base station 305, and various micro base stations 303, 307, and 309. The macro base station 305 has a corresponding macro cell, and the micro base stations 303, 307, and 309 have corresponding micro cells.

When the vehicular mobile terminal 301 within a cell coverage of the macro base station 305 gains initial random access to the macro base station 305, in 311, the macro base station 305 registers the vehicular mobile terminal 301, for example, through communication with a serving micro base station 303, in 313. For example, the vehicular mobile terminal 301 may include at least one of a femto base station, a moving relay, and a mobile terminal.

The macro base station 305 identifies a mobility of the vehicular mobile terminal 301 in the multi-cell group, in 315, and the macro base station 305 detects a change in the mobility of the vehicular mobile terminal 301, in 317.

For example, the mobility of the vehicular mobile terminal 301 may include a traveling speed, a traveling direction, an estimated cell residence time, a traveling path, and the like, of the vehicular mobile terminal 301. For example, the estimated cell residence time may be changed based on a radius of the cell coverage. For example, the estimated cell residence time may be changed based on GPS information of the vehicular mobile terminal 301, traveling speed information of the vehicular mobile terminal 301, information about road conditions such as change time information of a traffic light, and the like. In some embodiments, an intensity of a signal (for example, uplink broadcast information) received from the vehicular mobile terminal 301 to the serving micro base station 303 and the neighbor micro base stations 307 and 309 may also be represented by a mobility function.

The macro base station 305 allocates a unique access code and a channel for the unique access code to the vehicular mobile terminal 301, for example, based on the mobility of the vehicular mobile terminal 301, in 319.

The unique access code allocated to the vehicular mobile terminal 301 is identified by the vehicular mobile terminal 301 in the multi-cell group, the serving micro base station 303 that is providing a communication service to the vehicular mobile terminal 301, and the neighbor micro base stations 307 and 309, in 321.

The vehicular mobile terminal 301 broadcasts uplink broadcast information including the unique access code to the plurality of micro base stations 303 and 307 within the cell coverage of the macro base station 305, in 323. For example, the uplink broadcast information including the unique access code broadcasted by the vehicular mobile terminal 301 may only reach the neighbor micro base station 1 307, and may not reach the micro base station 2 309.

In 323, for example, the neighbor micro base station 1 307 may overhear the uplink broadcast information including the unique access code from the vehicular mobile terminal 301. Accordingly, in 323 the neighbor micro base station 1 307 may report information about a receiving state of the uplink broadcast information to the serving micro base station 303 of the vehicular mobile terminal 301.

For example, the plurality of neighbor micro base stations (here, the neighbor micro base station 1 307) within the cell coverage of the macro base station 305 may estimate an uplink timing offset or quality of service (QoS) of the vehicular mobile terminal 301 based on the overheard uplink broadcast information including the unique access code. As another example, the serving micro base station 303 and the neighbor micro base stations (here, the neighbor micro base station 1 307) within the cell coverage of the macro base station 305 may estimate a cell residence time of the vehicular mobile terminal 301 based on the uplink broadcast information received from the vehicular mobile terminal 301.

To estimate the cell residence time of the vehicular mobile terminal 301, the serving micro base station 303 and the neighbor micro base stations (here, the neighbor micro base station 1 307) may use, for example, GPS information of the vehicular mobile terminal 301, traveling speed information of the vehicular mobile terminal 301, information about road conditions such as change time information of a traffic light, and the like.

The serving micro base station 303 collects information about the receiving state of the uplink broadcast information of the neighbor micro base station 1 307 based on the report from the neighbor micro base station 1 307, in 325.

The serving micro base station 303 may determine whether to perform a handover of the vehicular mobile terminal 301 based on the uplink broadcast information. In addition, the serving micro base station 303 may determine a preparation level of the handover associated with a level of an operation used for the serving micro base station 303 and the neighbor micro base station 1 307 to perform the handover. For example, the serving micro base station 303 may determine the preparation level of the handover based on the uplink broadcast information received by the serving micro base station 303 and the uplink broadcast information received by the neighbor micro base station 1 307.

The serving micro base station 303 may determine the preparation level of the handover as one of a plurality of levels, For example, the plurality of the levels may include at least one of a preregistration of each of the serving micro base station 303 and the neighbor micro base station 1 307, an uplink synchronization setup, an acceptance of a handover and performance of the handover, a joint interference control for the vehicular mobile terminal 301, a joint processing on the vehicular mobile terminal 301, a cell merger, and the like.

An example in which the preparation level of the handover is determined is joint processing on the vehicular mobile terminal 301 in operation 327 is described with reference to the examples of FIGS. 3A and 3B.

In this example, the serving micro base station 303 exchanges new topology information for a joint processing on the vehicular mobile terminal 301 with the neighbor micro base station 1 307, in 329. For example, the new topology information may include information used for communication with the neighbor micro base station 1 307 based on a joint processing on the vehicular mobile terminal 301.

The vehicular mobile terminal 301 transmits and receives data for the vehicular mobile terminal 301 in cooperation with the neighbor micro base station 1 307, in 331. The vehicular mobile terminal 301 broadcasts the uplink broadcast information including the unique access code again, in 333. For example, the uplink broadcast information including the unique access code may be broadcasted to not only the neighbor micro base station 1 307 but also to the neighbor micro base station 2 309 due to the mobility of the vehicular mobile terminal 301.

The serving micro base station 303 may collect information about a receiving state of the uplink broadcast information from not only the neighbor micro base station 1 307 but also the neighbor micro base station 2 309, in 335.

The serving micro base station 303 determines the preparation level of the handover again based on the collected information in operation 335, and may determine a joint processing on the vehicular mobile terminal 301 with the neighbor micro base station 1 307 and the neighbor micro base station 2 309, in 337. The data is then processed in 339.

For example, when the serving micro base station 303 determines a joint processing on the vehicular mobile terminal 301, the serving micro base station 303 may transmit and receive data for the vehicular mobile terminal 301 in cooperation with the neighbor micro base station 1 307 and the neighbor micro base station 2 309, in 331. Accordingly, the data may be joint-processed by the serving micro base station 303 and the vehicular mobile terminal 301 in cooperation with the neighbor micro base station 1 307 and the neighbor micro base station 2 309.

Referring to FIG. 3B, the vehicular mobile terminal 301 continually broadcasts the uplink broadcast information according to the mobility of the vehicular mobile terminal 301, in 341, and the serving micro base station collects information of a receiving state of the uplink broadcast information from the neighbor micro base stations 307 and 309, in operation 343.

When it is determined that a handover is needed for the vehicular mobile terminal 301, the serving micro base station 303 may determine the preparation level of the handover to be a handover performance. For example, in 345 the serving micro base station 303 may determine a handover to the neighbor micro base station 1 307 which is a neighbor micro base station that the vehicular mobile terminal 301 is approaching.

In 345, the serving micro base station 303 may determine the preparation level of the handover based on the uplink broadcast information received by the serving micro base station 303, and the uplink broadcast information and the information about the receiving state of the uplink broadcast information received by the neighbor micro base stations 307 and 309.

Based on the determining the need for the handover, the micro base station 303 that was acting as a serving micro base station becomes a neighbor micro base station, and the base station 307 that was acting as a neighbor micro base station becomes a serving micro base station.

After the handover, the vehicular mobile terminal 301 with mobility continually broadcasts the uplink broadcast information, in 347, and the new serving micro base station 307 collects information about a receiving state of the uplink broadcast information from the neighbor micro base stations 303 and 309, in 349.

The new serving micro base station 307 determines a preparation level of a handover to be a handover performance to the neighbor micro base station 2 309 based on the mobility of the vehicular mobile terminal 301, in 351.

In 351, for example, the serving micro base station 307 may determine the preparation level of the handover based on the uplink broadcast information received from the vehicular mobile terminal 301, and the uplink broadcast information and the information about the receiving state of the uplink broadcast information collected from the neighbor adjacent micro base stations 303 and 309.

Based on the determination of performance of the handover in 351, the serving micro base station 307 transmits new topology information to the vehicular mobile terminal 301 and the neighbor micro base station 309 to be a next serving micro base station, in 353. For example, the neighbor micro base station 2 309 may become a serving micro base station based on the performance of the handover.

The vehicular mobile terminal 301 broadcasts the uplink broadcast information including the unique access code based on the mobility, in 355.

The serving micro base station 309 receiving the uplink broadcast information including the unique access code from the vehicular mobile terminal 301 detects that the vehicular mobile terminal 301 is leaving the cell coverage of the macro base station 305, in 357.

The macro base station 305 regains the unique access code and the channel for the unique access code allocated to the vehicular mobile terminal 301 when the vehicular mobile terminal 301 moves beyond the coverage of the macro cell, in 359.

As described above, the serving micro base station 307 may allocate or regain a unique access code and a channel for the access code to the vehicular mobile terminal 301 instead of the macro base station 305, and may report about this to the macro base station 305.

The aforementioned handover based on the uplink broadcast information may be used along with a general handover scheme, which is described with reference to FIG. 4.

FIG. 4 illustrates an example of a switch from a general handover scheme based on a measurement report of a downlink signal and to a handover scheme based on uplink broadcast information.

Referring to FIG. 4, the multi-cell group includes a vehicular mobile terminal 401 and various micro base stations 403, 405, and 407. The micro base stations 403, 405, and 407 have corresponding micro cells.

For example, when a vehicular mobile terminal 401 stops or travels at a low speed, a handover may be performed according to a general handover scheme. In 410, a serving micro base station 403 and a neighbor micro base station 1 405 transmit a preamble and a synchronization channel to the vehicular mobile terminal 401.

For example, the vehicular mobile terminal 401 measures a preamble signal or a synchronization signal received through a downlink, and transmits a measurement report to the serving micro base station 403, in 415.

The serving micro base station 403 determines to perform a handover based on the report, in 420, and performs the handover, in 425. As a result of the handover, the base station 403 that was the serving micro base station becomes a neighbor micro base station, and the base station 405 that was the neighbor micro base station becomes a serving micro base station.

In an area where the vehicular mobile terminal 401 travels at a high speed, the serving micro base station 405 may identify the high speed mobility of the vehicular mobile terminal, in 430.

In 435, the serving micro base station 405 allocates a unique access code and a channel for the unique access code to the vehicular mobile terminal 401 according to a mobility of the vehicular mobile terminal 401.

Subsequently, in operations 440 to 455, a neighbor micro base station 2 407 may become a new serving micro base station. Operations 440 to 455 are similar to operations 341 to 345 described above with reference to FIGS. 3A and 3B, and thus description thereof will not be repeated.

When serving micro base station detects that the vehicular mobile terminal 401 to which the unique access code is allocated decreases in mobility or has no mobility, in 460, the serving micro base station 407 may request the vehicular mobile terminal 401 to return the unique access code and the channel for the unique access code, in 465.

The serving micro base station 407 regains the unique access code and the channel for the unique access code from the vehicular mobile terminal 401, in 470.

Accordingly, as described with reference to FIG. 4, a micro base station may perform a general handover based on a measurement report of a downlink. In addition, a micro base station may perform a handover based on uplink broadcast info. The micro base station may switch between a general handover and a handover based on uplink broadcast info. For example, the micro base station may switch a handover method when a handover is requested from a mobile terminal, based on the current mobility of the mobile terminal.

Figure 5:
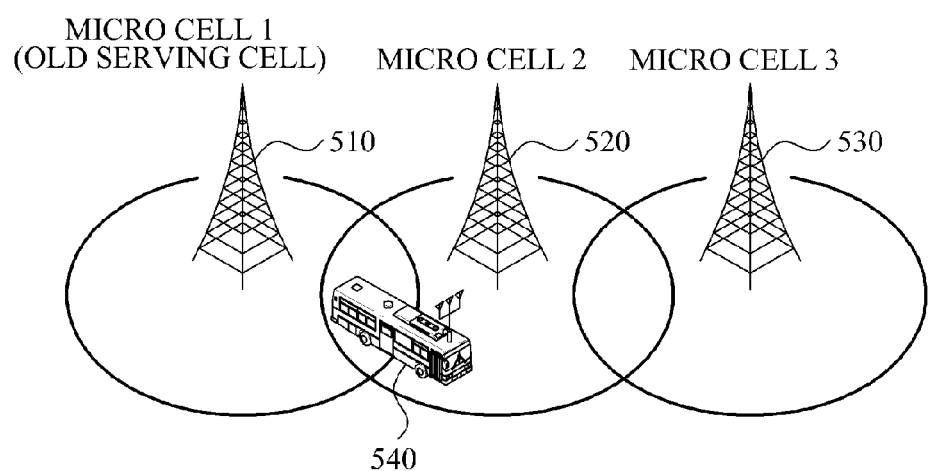
FIG. 5 is a diagram illustrating an example of a preparation level of a handover that is determined differently in each cell of a multi-cell group.

FIG. 5 illustrates an example of a preparation level of a handover that is determined differently in each cell of a multi-cell group.

Referring to FIG. 5, the multi-cell group includes a base station of a micro cell 1 510, a base station of a micro cell 2 520, a base station of a micro cell 3 530, and a vehicular mobile terminal 540. In this example, the micro cells 510, 520, and 530 are adjacent to each other.

In this example, the backhaul environment of the multi-cell group includes a non-data sharing environment such as X2 interface or internet, and the vehicular mobile terminal 540 has a mobility from the micro cell 1, the micro cell 2, to the micro cell 3. Also in this example, the micro base station of the micro cell 1 510 functions as a serving micro base station, the micro base station of the micro cell 2 520 is a neighbor micro base station, and the micro base station of the micro cell 3 530 is another neighbor micro base station.

When the vehicular mobile terminal 540 has a low mobility, for example, a low traveling speed of the vehicular mobile terminal 540, the serving micro base station 510 may determine to perform a handover to the microcell 2 when determining a preparation level of a handover of the vehicular mobile terminal 540.

For example, the serving micro base station 510 may determine the preparation level of the handover to perform a joint interference control for the vehicular mobile terminal 540 with the neighbor micro base station 520.

Accordingly, the neighbor micro base station 520 may accept the handover of the vehicular mobile terminal 540, may perform an uplink synchronization process, and may perform a joint interference control with the serving micro base station 510.

When the vehicular mobile terminal 540 changes from a low mobility to a medium mobility, for example, a medium traveling speed, it may become difficult to share a joint interference control signal because of the increase in traveling speed. That is, a joint interference control between the serving micro base station 510 and the neighbor micro base station 520 may be difficult to perform when the vehicular mobile terminal 540 that had a low mobility increases to a medium mobility.

In this example, when the serving micro base station 510 determines the handover to the micro cell 2 520, the neighbor micro base station 520 may accept the handover of the vehicular mobile terminal 540 and perform an uplink synchronization process.

When the vehicular mobile terminal 540 has a high mobility, for example, a high traveling speed of the vehicular mobile terminal 540, a handover to the micro cell 3 may be performed in a short time after the handover to the micro cell 2. Thus, the neighbor micro base station 530 may perform a preregistration process and an uplink synchronization process in advance.

For example, the backhaul environment of the multi-cell group may be a data sharing environment such as remote radio head (RRH), and the vehicular mobile terminal 540 may have a mobility from the micro cell 1, the micro cell 2, to the micro cell 3.

When the backhaul environment of the multi-cell group is RRH, data sharing is possible. When the vehicular mobile terminal 540 has a low mobility, for example, a low traveling speed of the vehicular mobile terminal 540, the serving micro base station 510 may determine a handover to the micro cell 2. The serving micro base station 510 may perform a joint interference control during data sharing, for example, joint processing with the neighbor micro base station 520.

The neighbor micro base station 520 may accept the handover of the vehicular mobile terminal 540 and may perform an uplink synchronization process and a joint interference control during data sharing.

The serving micro base station 510 and the neighbor micro base station 520 may perform the same preparation level of the handover in the vehicular mobile terminal 540 having medium or high mobility as in the backhaul environment of a non-data sharing environment.

In this example, the micro cell 3 is not immediately adjacent to the micro cell 1 corresponding to the serving micro base station 510. When the vehicular mobile terminal 540 has a high mobility, the neighbor micro base station 530 corresponding to the micro cell 3, may perform a preregistration process through a backhaul of the preparation level of the handover, and may further perform an uplink synchronization process.

As described above, the serving micro base station 510 and the neighbor micro base stations 520 and 530 may receive uplink broadcast information including a unique access code received from the vehicular mobile terminal 540.

For example, the serving micro base station 510 may determine the preparation level of the handover based on at least one of a mobility of the vehicular mobile terminal 540 in the multi-cell group, an estimated cell residence time of the vehicular mobile terminal 540, a backhaul environment between the serving micro base station 510 and the neighbor micro base stations 520 and 530, an amount of data used by the vehicular mobile terminal 540, a load of the serving micro base station 510, a load of the respective neighbor micro base stations 520 and 530, and the like.

Figure 6:
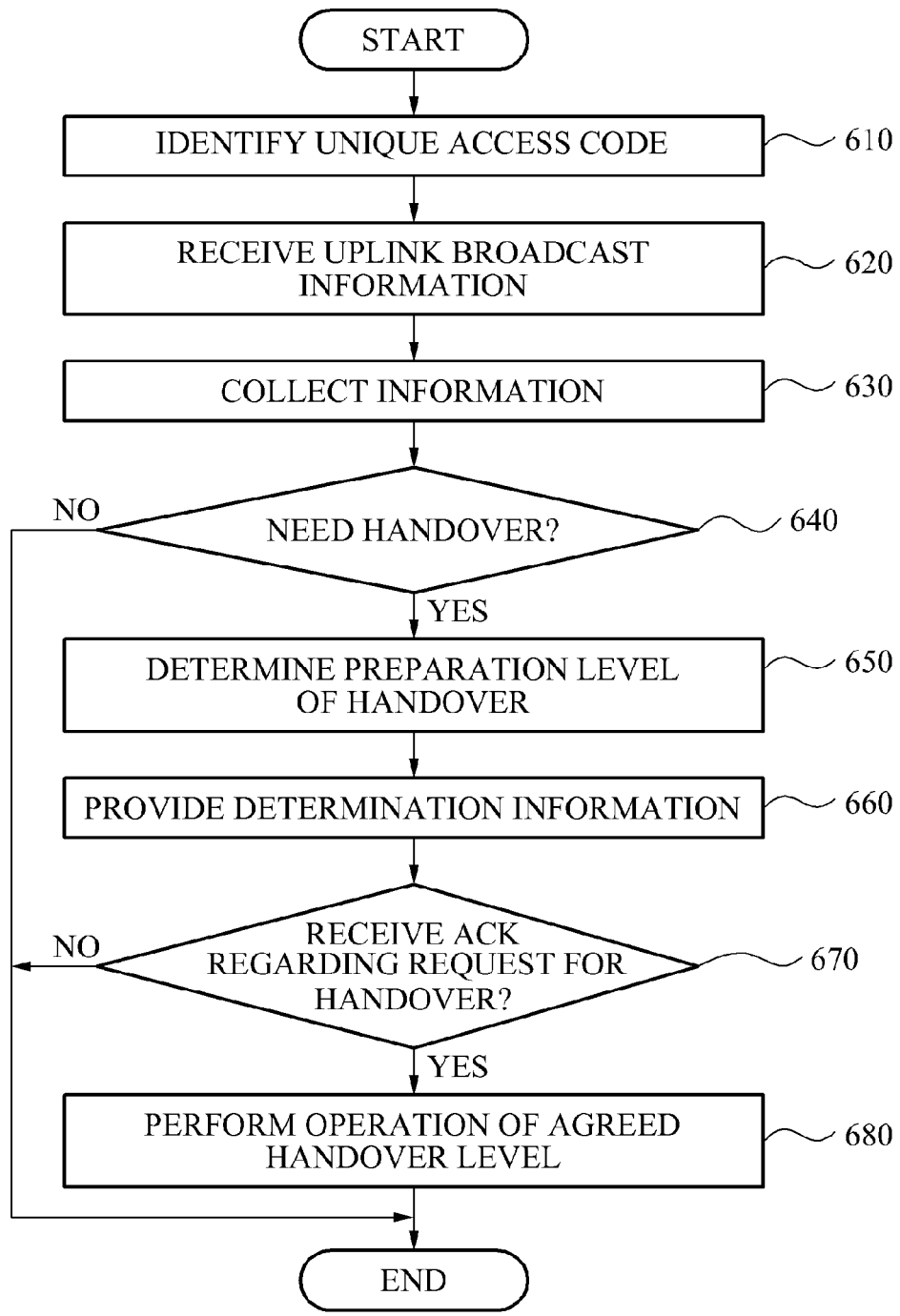
FIG. 6 is a flowchart illustrating an example of a communication method of a serving micro base station in a multi-cell group.

FIG. 6 illustrates an example of a communication method of a serving micro base station in a multi-cell group.

Referring to FIG. 6, the serving micro base station identifies a unique access code allocated to a vehicular mobile terminal in the multi-cell group, in 610. In this example, the multi-cell group includes at least a macro base station and a plurality of micro base stations within a cell coverage of the macro base station. In 620, the serving micro base station receives uplink broadcast information including the unique access code from the vehicular mobile terminal.

The serving micro base station collects information about a receiving state of the uplink broadcast information of a neighbor micro base station from the neighbor micro base station positioned in the multi-cell group, in 630. For example, the information about the receiving state of the uplink broadcast information may include information useful to determine a preparation level of a handover for each cell such as the load of each neighbor micro base station, information about wireless conditions, and the like.

The serving micro base station determines whether a handover is needed based on the uplink broadcast information received by the serving micro base station and the uplink broadcast information received by the neighbor micro base station, in 640. Based on the result of the determination in 640, the serving micro base station may determine a preparation level of a handover based on the aforementioned information when the handover is needed, in 650.

The preparation level of the handover determined in 650 may be any one of a plurality of levels, for example, at least one of a preregistration, an uplink synchronization setup, an acceptance of a handover and performance of the handover, a joint interference control for the vehicular mobile terminal, a joint processing on the vehicular mobile terminal, a cell merger, and the like.

For example, the joint interference control for the vehicular mobile terminal may be used to minimize interference in a channel, for example, frequency and time, which is allocated to the vehicular mobile terminal and being used. The joint interference control may enable coordinated communication by an exchange of control information between the serving micro base station and neighbor micro base stations.

Further, the joint processing on the vehicular mobile terminal may denote a shared joint processing and may enable a coordinated communication by sharing of data about the vehicular mobile terminal between the serving micro base station and neighbor micro base stations.

For example, the preparation level of the handover may be determined to be at least one preparation level from a preregistration having a low preparation complexity to a cell merger having a high preparation complexity. Further, the preparation level of the handover may be determined differently in each micro base station in which a handover is performed.

An example in which the vehicular mobile terminal has a high mobility and travels from a micro cell 1 to a micro cell 2 as described above with reference to FIG. 5 is described herein.

When the serving micro base station determines to perform a handover of the vehicular mobile terminal, a preparation level of the handover of the serving micro base station may be a performance of the handover, and a preparation level of the handover of a neighbor micro base station 1 may be an acceptance of the handover and a performance of an uplink synchronization process. In addition, a preparation level of the handover of a neighbor micro base station 2 may be a preregistration process and may further include a performance an uplink synchronization process as necessary.

As described above, for example, the preparation level of the handover may be determined differently based on a mobility of the vehicular mobile terminal, an estimated cell residence time of the vehicular mobile terminal, a backhaul environment between the serving micro base station and the neighbor micro base stations, an amount of data used by the vehicular mobile terminal, a load of the serving micro base station, a load of the neighbor micro base station, a wireless environment, and the like.

For example, the estimated cell residence time may be determined based on a size of a cell, a level of an uplink reception signal, a speed of the vehicular mobile terminal, a path of the vehicular mobile terminal, and the like.

The serving micro base station reports about the preparation level of the handover determined in 650 to the neighbor micro base station, in 660. At the same time, the serving micro base station may request a handover to the neighbor micro base station to perform the handover.

When receiving an acceptance of the handover, for example, an acknowledgement (ACK) signal from a micro base station that requested the handover, in 670, the serving micro base station performs the handover of the vehicular mobile terminal according to the preparation level of the handover determined, in 680.

Figure 7:
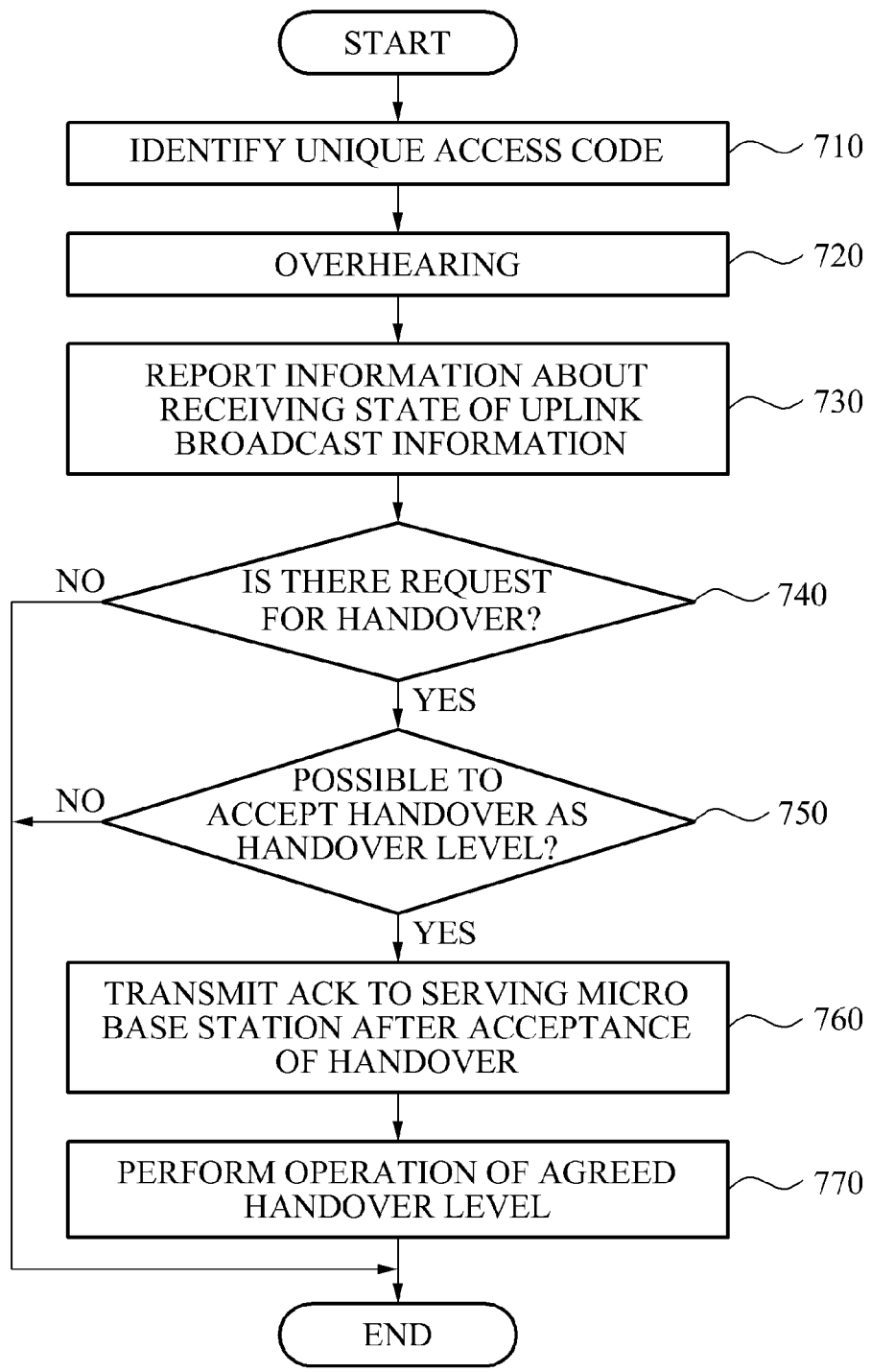
FIG. 7 is a flowchart illustrating an example of a communication method of a neighbor micro base station in a multi-cell group.

FIG. 7 illustrates an example of a communication method of a neighbor micro base station in a multi-cell group.

Referring to FIG. 7, in 710 the neighbor micro base station identifies a unique access code allocated to a vehicular mobile terminal in the multi-cell group. The multi-cell group includes at least a macro base station and a plurality of micro base stations within a cell coverage of the macro base station.

For example, in 710 the neighbor micro base station may receive information about a channel allocated for the unique access code from the macro base station. For example, the information about the channel may include information about a pattern of the access code and time or frequency allocated to the access code. The neighbor micro base station may estimate an uplink timing offset or QoS of a mobile terminal based on uplink broadcast information.

The neighbor micro base station overhears the uplink broadcast information including the unique access code from the vehicular mobile terminal, in 720.

In 730, the neighbor micro base station reports information about a receiving state of the uplink broadcast information to the serving micro base station of the vehicular mobile terminal.

In 730, the neighbor micro base station may report the information about the receiving state of the uplink broadcast information in order to determine a preparation level of a handover associated with a level of an operation used for the serving micro base station and the neighbor micro base station to perform the handover.

The neighbor micro base station may determine whether there is a request for a handover from the serving micro base station, in 740. The neighbor micro base station may identify a preparation level of a handover based on a report by the serving micro base station before and/or after performing 740.

For example, when the preparation level of the handover is determined to be a level including at least one of a joint interference control for the vehicular mobile terminal and a joint processing on the vehicular mobile terminal, the neighbor micro base station may respond to the request from the serving micro base station and perform a coordinated communication with the serving micro base station.

When there is a request for a handover from the serving micro base station in 740, the neighbor micro base station determines whether it is possible to accept the handover as the preparation level of the handover reported by the serving micro base station, in 750.

The neighbor micro base station accepts the handover when it is possible to accept the handover as the preparation level of the handover reported in 750, and reports about an acceptance of the handover to the serving micro base station, in 760, for example, by transmitting an ACK.

The neighbor micro base station performs the handover of the vehicular mobile terminal based on the preparation level of the handover agreed with the serving micro base station, in 770.

Figure 8:
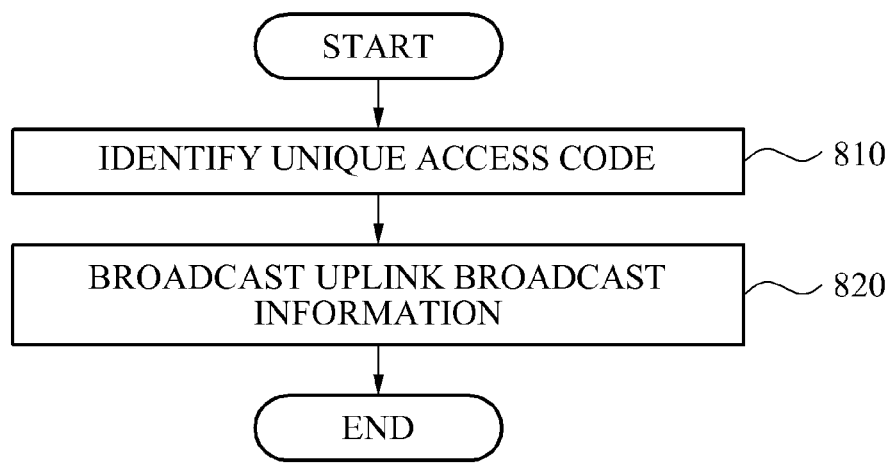
FIG. 8 is a flowchart illustrating an example of a communication method of a vehicular mobile terminal in a multi-cell group.

FIG. 8 illustrates an example of a communication method of a vehicular mobile terminal in a multi-cell group.

Referring to FIG. 8, in 810 the vehicular mobile terminal in the multi-cell group identifies a unique access code allocated to the vehicular mobile terminal in the multi-cell group. The multi-cell group includes a macro base station and a plurality of micro base stations within a cell coverage of the macro base station. The unique access code may be allocated by the macro base station. The vehicular mobile terminal broadcasts uplink broadcast information including the unique access code to the plurality of micro base stations, in 820.

In 820, the vehicular mobile terminal may receive information about a channel allocated for the unique access code from the macro base station, and may broadcast the uplink broadcast information using the channel allocated for the unique access code.

For example, the vehicular mobile terminal may include at least one of a femto base station, a moving relay, and a mobile terminal.

For example, the methods of the serving micro base station and the neighbor micro base station described above with reference to FIGS. 6 and 7 may be realized by a moving relay mounted on a vehicle. For example, a handover may be performed between a serving moving relay and a neighbor moving relay.

Figure 9:
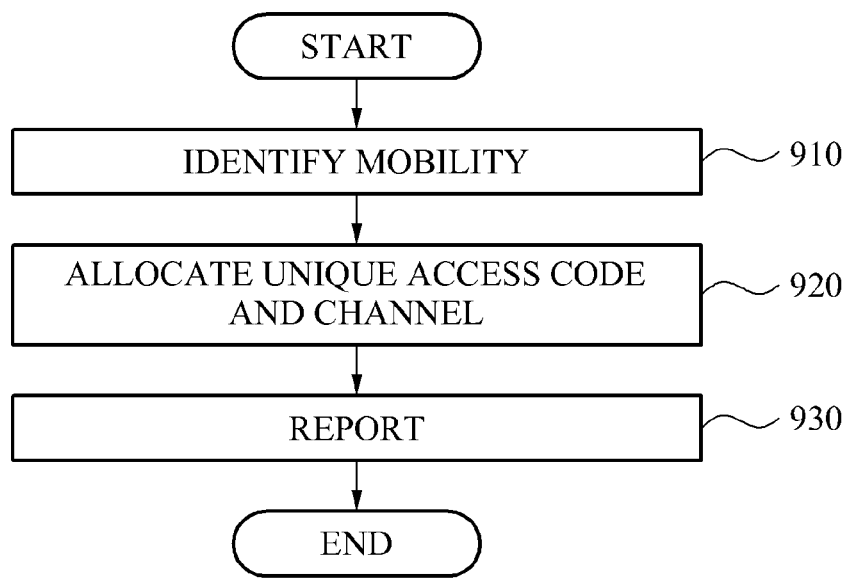
FIG. 9 is a flowchart illustrating an example of a communication method of a macro base station in a multi-cell group.

FIG. 9 illustrates an example of a communication method of a macro base station in a multi-cell group.

Referring to FIG. 9, in 910 the macro base station in the multi-cell group identifies a mobility of a vehicular mobile terminal in the cell. The multi-cell group includes at least the macro base station and a plurality of micro base stations within a cell coverage of the macro base station.

In 920, the macro base station allocates a unique access code and a channel for the unique access code to the vehicular mobile terminal according to the mobility of the vehicular mobile terminal.

The unique access code and the channel for the unique access code may be allocated, for example, to the vehicular mobile terminal having a mobility of a predetermined speed.

For example, the unique access code may be available for a channel measurement of the vehicular mobile terminal, uplink synchronization, a joint cell formation, and a handover determination.

For example, the mobility of the vehicular mobile terminal may include a traveling speed, a traveling direction, an estimated cell residence time, and a traveling path of the vehicular mobile terminal. The estimated cell residence time may be changed on a radius of the cell coverage or a level of an uplink reception signal.

As another example, the estimated cell residence time may be estimated using GPS information of the vehicular mobile terminal, traveling speed information of the vehicular mobile terminal, information about road conditions such as traffic light information, and the like, based on uplink broadcast information including the unique access code received from a serving micro base station.

The macro base station reports about the unique access code and the channel for the unique access code allocated to the vehicular mobile terminal, to the plurality of micro base stations, in 930.

For example, the plurality of micro base stations may include the serving micro base station to provide a communication service to the vehicular mobile terminal and a neighbor micro base station adjacent to the serving micro base station.

The macro base station may regain the unique access code and the channel for the unique access code based on the mobility of the vehicular mobile terminal.

For example, as described above with reference to FIGS. 3 and 4, the macro base station may regain the unique access code and the channel for the unique access code allocated to the vehicular mobile terminal when the vehicular mobile terminal moves beyond coverage of a macro cell or decreases in mobility.

The macro base station may forward data about the vehicular mobile terminal from the serving micro base station to one or more neighbor micro base stations according to a renewed data forwarding path when a preparation level of a handover associated with a level of an operation used for the serving micro base station and the neighbor micro base station to perform the handover uses cooperation between the serving micro base station and the neighbor micro base station.

In addition, the macro base station may forward the data about the vehicular mobile terminal to a neighbor micro base station when the preparation level of the handover associated with a level of an operation used for a serving micro base station and the neighbor micro base station to perform the handover requests cooperation between the serving micro base station and the neighbor micro base station.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a serving micro base station that is serving a vehicular mobile terminal, the method comprising:
    identifying a unique access code allocated to the vehicular mobile terminal in a multi-cell group comprising a macro base station and a plurality of micro base stations that are within a cell coverage of the macro base station, the unique access code comprising a returnable identification of the vehicular mobile terminal while the vehicular mobile terminal is within the cell coverage of the macro base station;
    receiving uplink broadcast information including the unique access code from the vehicular mobile terminal;
    performing a handover of the vehicular mobile terminal based on the uplink broadcast information; and
    regaining the unique access code from the vehicular mobile terminal, in response to the vehicular mobile terminal decreasing in mobility.

2. The method of claim 1, wherein the unique access code is allocated to the vehicular mobile terminal based on a mobility of the vehicular mobile terminal.

3. The method of claim 1, further comprising collecting information about a receiving state of the uplink broadcast information of a neighbor micro base station from the neighbor micro base station in the multi-cell group.

4. The method of claim 1, further comprising determining a preparation level of a handover associated with a level of an operation used for the serving micro base station and a neighbor micro base station to perform the handover.

5. The method of claim 4, wherein the determining of the preparation level of the handover comprises determining a preparation level of the handover based on the uplink broadcast information received by the serving micro base station and uplink broadcast information received by the neighbor micro base station.

6. The method of claim 4, wherein the determining of the preparation level of the handover comprises determining a preparation level of the handover based on at least one of a mobility of the vehicular mobile terminal, an estimated cell residence time of the vehicular mobile terminal, a backhaul environment between the serving micro base station and the neighbor micro base station, an amount of data used by the vehicular mobile terminal, a load of the serving micro base station, and a load of the neighbor micro base station.

7. The method of claim 4, further comprising reporting about the determined preparation level of the handover to the neighbor micro base station.

8. The method of claim 4, wherein the determining of the preparation level of the handover may comprise determining a preparation level of the handover to be at one of a plurality of levels including at least one of a preregistration, an uplink synchronization setup, an acceptance of a handover and performance of the handover, a joint interference control for the vehicular mobile terminal, a joint processing on the vehicular mobile terminal, and a cell merger.

9. The method of claim 6, further comprising estimating a cell residence time of the vehicular mobile terminal based on the uplink broadcast information received from the serving micro base station.

10. The method of claim 1, wherein the vehicular mobile terminal comprises at least one of a femto base station, a moving relay, and a mobile terminal.

11. A communication method of a neighbor micro base station, the method comprising:
identifying a unique access code allocated to a vehicular mobile terminal in a multi-cell group comprising a macro base station and a plurality of micro base stations within a cell coverage of the macro base station, the unique access code comprising a returnable identification of the vehicular mobile terminal while the vehicular mobile terminal is within the cell coverage of the macro base station;
overhearing uplink broadcast information including the unique access code from the vehicular mobile terminal;
reporting information about a receiving state of the uplink broadcast information to a serving micro base station that is serving the vehicular mobile terminal; and
regaining the unique access code from the vehicular mobile terminal, in response to the vehicular mobile terminal decreasing in mobility.

12. The method of claim 11, wherein the reporting information about the receiving state of the uplink broadcast information comprises reporting the information about the receiving state of the uplink broadcast information in order to determine a preparation level of a handover associated with a level of an operation used for the serving micro base station and a neighbor micro base station to perform the handover.

13. The method of claim 12, further comprising identifying the preparation level of the handover based on a report of the serving micro base station.

14. The method of claim 13, further comprising performing the handover of the vehicular mobile terminal based on the preparation level of the handover.

15. The method of claim 11, wherein the identifying of the unique access code comprises receiving information about a channel allocated for the unique access code from the macro base station.

16. The method of claim 13, further comprising performing coordinated communication with the serving micro base station based on the determination of the serving micro base station, when the preparation level of the handover is determined to be a level including at least one of joint interference control for the vehicular mobile terminal and joint processing on the vehicular mobile terminal.

17. The method of claim 12, further comprising estimating an uplink timing offset or estimating a quality of service (QoS) of the vehicular mobile terminal, based on the uplink broadcast information.

18. A communication method of a vehicular mobile terminal, the method comprising:
identifying a unique access code allocated to the vehicular mobile terminal in a multi-cell group comprising a macro base station and a plurality of micro base stations within a cell coverage of the macro base station, the unique access code comprising a returnable identification of the vehicular mobile terminal while the vehicular mobile terminal is within the cell coverage of the macro base station;
broadcasting uplink broadcast information including the unique access code to the plurality of micro base stations; and
returning the unique access code to the macro base station, in response to the vehicular mobile terminal decreasing in mobility.

19. The method of claim 18, further comprising receiving information about a channel allocated for the unique access code from the macro base station, wherein the broadcasting of the uplink broadcast information comprises broadcasting the uplink broadcast information using the channel allocated for the unique access code.

20. A communication method of a macro base station, the method comprising:
identifying a mobility of a vehicular mobile terminal in a multi-cell group comprising the macro base station and a plurality of micro base stations within a cell coverage of the macro base station;
allocating a unique access code and a channel for the unique access code to the vehicular mobile terminal based on the mobility of the vehicular mobile terminal, the unique access code comprising a returnable identification of the vehicular mobile terminal while the vehicular mobile terminal is within the cell coverage of the macro base station;
reporting about the unique access code and the channel for the unique access code to the plurality of micro base stations; and
regaining the unique access code from the vehicular mobile terminal, in response to the vehicular mobile terminal decreasing in mobility.

21. The method of claim 20, further comprising forwarding data about the vehicular mobile terminal from a serving micro base station to a neighbor micro base station based on a renewed data forwarding path, when a preparation level of a handover associated with a level of an operation used for the serving micro base station and the neighbor micro base station to perform the handover uses data forwarding.

22. The method of claim 20, further comprising forwarding data about the vehicular mobile terminal to a neighbor micro base station when a preparation level of a handover associated with a level of an operation used for a serving micro base station and the neighbor micro base station to perform the handover uses cooperation between the serving micro base station and the neighbor micro base station.

23. A non-transitory computer-readable storage medium having stored therein program instructions to cause a processor to implement a communication method of a serving micro base station that is serving a vehicular mobile terminal, the method comprising:
identifying a unique access code allocated to the vehicular mobile terminal in a multi-cell group comprising a macro base station and a plurality of micro base stations that are within a cell coverage of the macro base station, the unique access code comprising a returnable identification of the vehicular mobile terminal while the vehicular mobile terminal is within the cell coverage of the macro base station;

receiving uplink broadcast information including the unique access code from the vehicular mobile terminal;

performing a handover of the vehicular mobile terminal based on the uplink broadcast information; and regaining the unique access code from the vehicular mobile terminal, in response to the vehicular mobile terminal decreasing in mobility.

24. The method of claim 1, wherein the regaining of the unique access code from the vehicular mobile terminal comprises regaining the unique access code in response to the vehicular mobile terminal continuing to be moving but the speed at which the vehicular mobile terminal is moving decreases below a predetermined mobility.

* * * * *